April 29, 1958 L. SZILARD 2,832,733
HEAVY WATER MODERATED NEUTRONIC REACTOR
Filed April 23, 1946 8 Sheets-Sheet 1

Witnesses:
Herbert E. Metcalf
Francis W. Test

Inventor:
Leo Szilard
By: Robert A. Saunders
Attorney

April 29, 1958 L. SZILARD 2,832,733
HEAVY WATER MODERATED NEUTRONIC REACTOR
Filed April 23, 1946 8 Sheets-Sheet 6

Witnesses:
Herbert E. Metcalf
Francis W. Test

Inventor:
Leo Szilard
By Robert R. Lounder
Attorney.

April 29, 1958 L. SZILARD 2,832,733
HEAVY WATER MODERATED NEUTRONIC REACTOR
Filed April 23, 1946 8 Sheets-Sheet 7
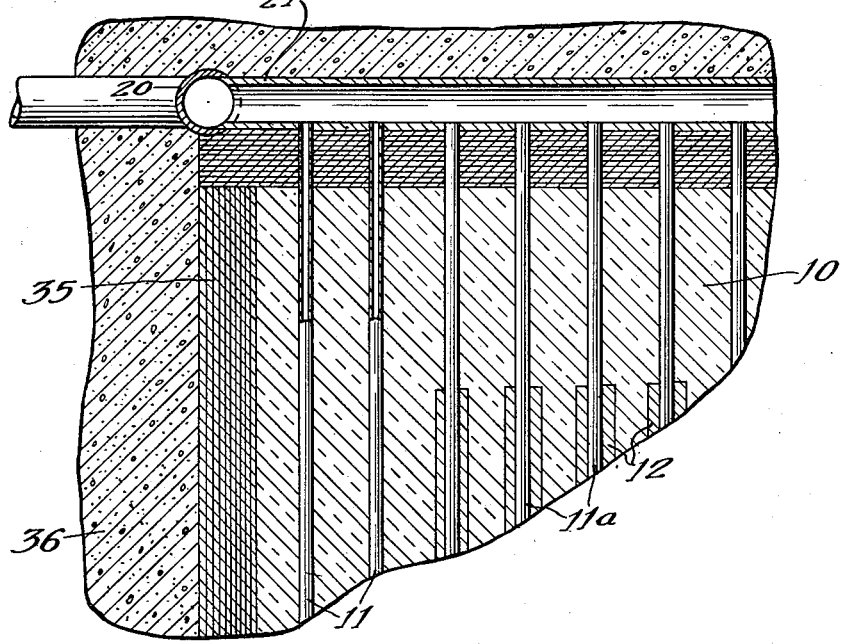
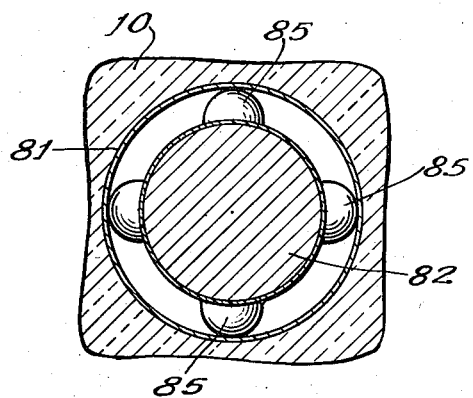
Witnesses:
Herbert E. Metcalf
Francis W. Test
Inventor:
Leo Szilard
By: Robert A. Lavender
Attorney April 29, 1958   L. SZILARD   2,832,733
HEAVY WATER MODERATED NEUTRONIC REACTOR
Filed April 23, 1946   8 Sheets-Sheet 8
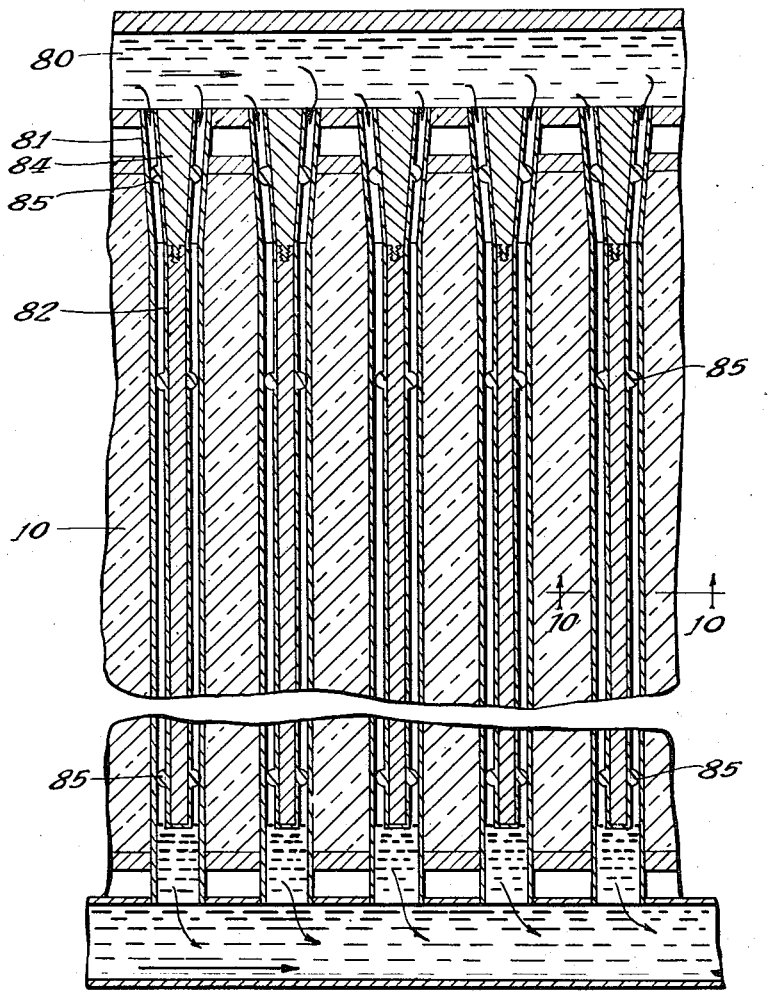

2,832,733
HEAVY WATER MODERATED NEUTRONIC REACTOR

Leo Szilard, Chicago, Ill., assignor to the United States of America as represented by the United States Atomic Energy Commission Application April 23, 1946, Serial No. 664,145

1 Claim. (Cl. 204—193.2)

The present invention relates to the subject of neutronics, and more particularly to a liquid cooled neutron chain reacting system, also referred to as a neutronic reactor, or pile, the latter name having been originally adopted for the active portions of systems employing uranium or other fissionable bodies geometrically arranged in graphite or other moderator in the form of lattice structures. More specifically the invention has to do with liquid cooled neutronic reactors in which a coolant passes over or through bodies of fissionable material inside the reactor, and this is cooled and recirculated in a closed sysem. For purposes of illustration, molten bismuth has been selected as one liquid coolant and water another.

As a result of the chain reaction, when $U^{238}$ is present (as in natural uranium), transuranic element $94^{239}$, known as plutonium, is produced. This material is fissionable and is valuable when added to natural uranium or thorium for use in a chain reacting system, as a fissionable body in lieu of or in conjunction with $U^{235}$.

Natural uranium contains both uranium isotopes $U^{235}$ and $U^{238}$ in the ratio of 1 to 139. The $U^{235}$ is the isotope fissionable by slow neutrons.

When fission occurs in the $U^{235}$ isotope, the following reaction takes place:

$$_{92}U^{235} + \text{neutron} \rightarrow A + B + \text{about 2 neutrons (average)}$$

where "A" represents "light" fission fragments having atomic masses ranging from 83 to 99 inclusive and atomic numbers from 34 to 45 inclusive; for example, Br, Kr, Rb, Sr, Y, Zr, Cb, Mo, Ma, Ru, and Rh; and "B" represents "heavy" fission fragments having atomic masses ranging from 127 to 141 inclusive, and atomic numbers from 51 to 60 inclusive; for example, Sb, Te, I, Xe, Ca, Ba, La, Ce, Pr, and Nd. The elements resulting from the fission are unstable and radioactive, with half-lives varying in length in accordance with the element formed.

The absorption of thermal or resonance neutrons by the $U^{238}$ isotope gives rise to the conversion of $U^{238}$ to $U^{239}$ which ultimately decays to transuranic element $94^{239}$. The reaction is as follows:

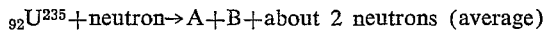
$91^{238} + n \longrightarrow 92^{239}$ [plus 6 m. e. v. of $\gamma$ rays, not necessarily all of one frequency]

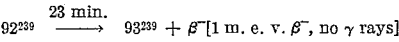
$92^{239} \xrightarrow{23 \text{ min.}} 93^{239} + \beta^{-}$[1 m. e. v. $\beta^{-}$, no $\gamma$ rays]

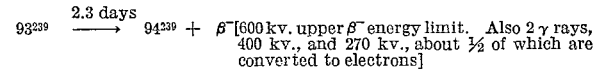
$93^{239} \xrightarrow{2.3 \text{ days}} 94^{239} + \beta^{-}$[600 kv. upper $\beta^{-}$ energy limit. Also 2 $\gamma$ rays, 400 kv., and 270 kv., about ½ of which are converted to electrons]

Most of the neutrons arising from the fission process are set free with the very high energy of above one million electron volts average and are therefore not in condition to be utilized efficiently to create new thermal neutron fissions in a fissionable body such as $U^{235}$ when it is mixed with a considerable quantity of $U^{238}$, particularly as in the case of natural uranium. The energies of the fission-released neutrons are so high that most of the latter would tend to be absorbed by the $U^{238}$ nuclei, and yet the energies are not generally high enough for production of fission by more than a small fraction of the neutrons so absorbed. For neutrons of thermal energies, however, the absorption cross section of $U^{235}$, to produce fission, is a great deal more than the simple capture cross-section of $U^{238}$; so that under the stated circumstances the fast fission neutrons, after they are created, must be slowed down to thermal energies before they are most effective to produce fresh fisssion by reaction with additional $U^{235}$ atoms. When a system is built in which neutrons are slowed down without excessive absorption until they reach thermal energies and then mostly enter into uranium rather than into any other element, a self-sustaining nuclear chain reaction is obtained, even with natural uranium. Light elements, such as deuterium, beryllium, oxygen or carbon, the latter in the form of graphite, can be used as slowing agents or moderators. A special advantage of the use of the light elements mentioned for slowing down fast fission neutrons is that fewer collisions are required for slowing than is the case with heavier elements, and furthermore, the above-enumerated elements have very small neutron capture probabilities, even for thermal neutrons. Carbon in the form of graphite is a relatively inexpensive, practical, and readily available agent for slowing fast neutrons to thermal energies. Deuterium while more expensive is especially valuable because of its low absorption of neutrons, and its compounds such as deuterium oxide have been used with very effective results.

However, in order for the premise to be fulfilled that the fast fission neutrons be slowed to thermal energies in a slowing medium without too large an absorption in the $U^{238}$ isotope of the uranium, certain types of physical structure should be utilized for the most efficient reproduction of neutrons, since unless precautions are taken to reduce various neutron losses and thus to conserve neutrons for the chain reaction the rate of neutron reproduction may be lowered and in certain cases lowered to a degree such that a self-sustaining reaction is not attained.

The ratio of the number of fast neutrons produced by the fissions, to the original number of fast neutrons creating the fissions, in a system of infinite size using specific materials is called the reproduction or multiplication factor of the system and is denoted by the symbol K. If K can be made sufficiently greater than unity to create a net gain in neutrons and the system made sufficiently large so that this gain is not entirely lost by leakage from the exterior surface of the system, then a self-sustaining chain reacting system can be built to produce power by nuclear fission of natural uranium. The neutron reproduction ratio in a system of finite size differs from K by the leakage factor and by localized neutron absorbers such as neutron absorbing controls, and must be sufficiently greater than unity to permit the neutron density to rise exponentially. Such a rise will continue if not controlled at a desired density corresponding to a desired power output.

During the interchange of neutrons in a system comprising bodies of uranium of any size in a slowing medium, neutrons may be lost in four ways, by absorption in the uranium metal or compound without producing fission, by absorption in the slowing down material, by absorption in impurities present in the system, and by leakage from the system. These losses will be considered in the order mentioned.

Natural uranium, particularly by reason of its $U^{238}$ content, has an especially strong absorbing power for neutrons when they have been slowed down to moderate energies. The absorption in uranium at these energies is termed the uranium resonance absorption or capture. It is caused by the isotope $U^{238}$ and does not result in fission but creates the isotope $U^{239}$ which by two successive beta emissions forms the relatively stable nucleus $94^{239}$. It is not to be confused with absorption or capture of neutrons by impurities, referred to later. Neutron resonance absorption in uranium may take place either on the surface of the uranium bodies, in which case the absorption is known as surface resonance absorption, or it may take place further in the interior of the uranium body, in which case the absorption is known as volume resonance absorption. It will be appreciated that this classification of resonance absorptions is merely a convenient characterization of observed phenomena, and arises, not because the neutron absorbing power of a $U^{238}$ nucleus is any greater when the nucleus is at the surface of a body of metallic, or combined uranium, but because the absorbing power of $U^{238}$ nuclei for neutrons of certain particular energies is inherently so high that practically all neutrons that already happen to have those energies, called resonance energies as explained above, are absorbed almost immediately upon their arrival in the body of the uranium metal or uranium compound, and thus in effect are absorbed at or close to the surface of such body. After successfully reaching thermal velocities, about 40 percent of the neutrons are also subject to capture by $U^{238}$ without fission, to produce $U^{239}$ and eventually $94^{239}$.

It is possible, by proper physical arrangement of the materials, to reduce substantially uranium resonance absorption. By the use of light elements as described above for slowing materials, a relatively large increment of energy loss is achieved in each collision and therefore fewer collisions are required to slow the neutrons to thermal energies, thus decreasing the probability of a neutron being at a resonance energy as it enters a uranium atom. During the slowing process, however, neutrons are diffusing through the slowing medium over random paths and distances so that the uranium is not only exposed to thermal neutrons but also to neutrons of energies varying between the emission energy of fission and thermal energy. Neutrons at uranium resonance energies will, if they enter uranium at these energies, be absorbed on the surface of a uranium body whatever its size, giving rise to surface absorption. Any substantial reduction of overall surface of the same amount of uranium relative to the amount of slowing material (i. e. the amount of slowing medium remaining unchanged) will reduce surface absorption, and any such reduction in surface absorption will release neutrons to enter directly into the chain reaction, i. e., will increase the number of neutrons available for further slowing and thus for reaction with $U^{235}$ to produce fission.

For a given ratio of slowing material to uranium, surface resonance absorption losses of neutrons in the uranium can be reduced by a large factor from the losses occurring in a mixture of fine uranium particles and a slowing medium, if the uranium is aggregated into substantial masses in which the mean radius of the aggregates is at least 0.25 centimeter for natural uranium metal and when the mean spatial radius of the bodies is at least 0.75 centimeter for the oxide of natural uranium ($UO_2$). Proportionate minimums exist for other uranium compounds the exact minimum value being dependent upon the uranium content and the density of the product. An important gain is thus made in the number of neutrons made directly available for the chain reaction. A similar gain is made when the uranium has more than the natural content of fissionable isotope. Where a maximum K factor is desired the uranium is placed in the system in the form of spaced uranium masses or bodies of substantial size, preferably either of metal, oxide, carbide, or other compound or combinations thereof. The uranium bodies can be in the form of layers, rods or cylinders, cubes or spheres, or similar shapes, dispersed throughout the moderator, preferably in some geometric pattern. The term geometric is used to mean any pattern or arrangement wherein the uranium bodies are distributed in the graphite or other moderator with either a roughly uniform spacing or with a roughly systematic non-uniform spacing, and are at least roughly uniform in size and shape or are systematic in variations of size or shape to produce a volume pattern conforming to a roughly symmetrical system. If a pattern is a repeating or rather exactly regular one, a system embodying it may be conveniently described as a lattice structure. The effect of such lattice construction is more fully disclosed and claimed in United States Patent 2,708,656 of Fermi and Szilard, Serial No. 568,904 filed December 19, 1944. Actual K factors as high as 1.07 have been obtained using lattices of natural uranium dispersed in graphite in the best known geometry, and with as pure materials as it is presently possible to obtain.

Assuming theoretically pure carbon and theoretically pure natural uranium metal, both of the highest obtainable densities, the maximum possible K factor theoretically obtainable is about 1.1 when the uranium is aggregated with optimum geometry. Still higher K factors can be obtained by the use of aggregation in the case of uranium having more than the naturally occurring content of fissionable isotope. Adding such fissionable isotope is termed enrichment of the uranium.

Somewhat higher K factors are obtainable where a moderator such as deuterium oxide is used. With deuterium oxide K factors of about 1.27 may be obtained.

Impurities present in the reactor add a very important neutron loss factor in the chain. The effectiveness of various elements as neutron absorbers varies tremendously. Certain elements such as boron, cadmium, samarium, gadolinium, and some others, if present even in a few parts per million, could prevent a self-sustaining chain reaction from taking place. It is highly important, therefore, to remove as far as possible all impurities capturing neutrons to the detriment of the chain reaction from both the slowing material and the uranium. If these impurities, solid, liquid, or gaseous, and in elemental or combined form, are present in too great quantity, in the uranium bodies or the slowing material or in, or by absorption from, the free spaces of the system, the self-sustaining chain reaction cannot be attained. The amounts of impurities that may be permitted in a system, vary with a number of factors, such as the specific geometry of the system, and the form in which the uranium is used—that is, whether natural or enriched, whether as metal or oxide—and also factors such as the weight ratios between the uranium and the slowing down material, and the type of slowing down or moderating material used—for example, whether graphite or deuterium. Although all of these considerations influence the actual permissible amount of each impurity material, it has fortunately been found that, in general, the effect of any given impurity or impurities can be correlated directly with the weight of the impurity present and with the K factor of the system, so that knowing the K factor for a given geometry and composition, the permissible amounts of particular impurities can be readily computed without taking individual account of the specific considerations named above. Different impurities are found to affect the operation to widely different extents; for example, relatively considerable quantities of elements such as hydrogen may be present, and, as previously suggested, the uranium may be in the form of oxide, such as $UO_2$ or $U_3O_8$, or carbide, although the metal is preferred. Nitrogen may be present to some extent, and its effect on the chain reaction is such that the neutron reproduction ratio of the system may be changed by changes in atmospheric pressure. This effect may be eliminated by enclosing or evacuating the system if desired, or may be utilized by determining changes in a particular system in the reproduction ratio as changes occur in the atmospheric pressure.

The effect of impurities on the optimum reproduction factor K may be conveniently evaluated to a good approximation, simply by means of certain constants known as "danger coefficients" which are assigned to the various elements. These danger coefficients for the impurities are each multiplied by the percent by weight of the corresponding impurity, and the total sum of these products gives a value known as the total danger sum. This total danger sum is subtracted from the reproduction factor K as calculated for pure materials and the specific geometry under consideration.

The danger coefficients are defined in terms of the ratio of the weight of impurity per unit mass of uranium and are based on the cross-section for absorption of thermal neutrons of the various elements. These values may be obtained from physics textbooks on the subject and the danger coefficient computed by the formula $$\frac{\sigma_i}{\sigma_u} = \frac{A_u}{A_i}$$

wherein $\sigma_1$ represents the cross-section for the impurity and $\sigma_u$ the cross-section for the uranium, $A_i$ the atomic weight of the impurity and $A_u$ the atomic weight for uranium. If the impurities are in the carbon, they are computed as their percent of the weight of the uranium of the system.

Presently known values for danger coefficients for some elements are given in the following table, wherein the elements are assumed to have their natural isotopic constitution unless otherwise indicated, and are conveniently listed according to their chemical symbols:

| Element | Danger Coefficient | Element | Danger Coefficient |
|---|---|---|---|
| He | 0 | Cl | 31 |
| Li | 310 | K | 2.1 |
| B | 2,150 | Ca | 0.37 |
| N | 4.0 | Ti | 3.8 |
| F | 0.02 | V | 4 |
| Na | 0.65 | Cr | 2 |
| Mg | 0.48 | Mn | 7.5 |
| Al | 0.30 | Fe | 1.5 |
| Si | 0.26 | Co | 17 |
| P | 0.3 | Ni | 3 |
| S | 0.46 | Cu | 1.8 |
| Zn | 0.61 | Sn | 0.18 |
| Ga | 1 | Sb | 1.6 |
| As | 2 | I | 1.6 |
| Se | 6.3 | Ba | 0.30 |
| Br | 2.5 | Sm | 1,430 |
| Rh | 50 | Eu | 435 |
| Ag | 18 | Gd | 6,320 |
| Cd | 870 | Pb | 0.03 |
| In | 54.2 | Bi | 0.0025 |
| | | Th | 1.1 |

Where an element is necessarily used in an active part of a system, it is still to be considered as an impurity; for example, in a structure where the uranium bodies consist of uranium oxide, the actual factor K would ordinarily be computed by taking that fact into account using as a base K a value computed for theoretically pure uranium.

As a specific example, if the materials of the system under consideration have .0001 part by weight of N, Co, and Ag, the total danger sum in K units for such an analysis would be:

$$.0001 \times 4 + .0001 \times 17 + .0001 \times 18 = .0039 \text{ K units}$$

This would be a rather unimportant reduction in the reproduction factor K unless the reproduction factor for a given system, without considering any impurities, is very nearly unity. If, on the other hand, the impurities in the uranium in the previous example had been Li, Co, and Rh, the total danger sum would be:

$$.0310 + .0017 + .0050 = .0377 \text{ K units}$$

This latter reduction in the reproduction factor for a given system would be serious and might well reduce the reproduction factor below unity for certain geometries and certain moderators so as to make it impossible to effect a self-sustaining chain reaction with natural uranium and graphite, but might still be permissible when using enriched uranium in a system having a high K factor.

This strong absorbing action of some elements renders a self-sustaining chain reacting system capable of control. By introducing neutron absorbing elements in the form of rods or sheets into the interior of the system, for instance in the slowing material between the uranium masses, the neutron reproduction ratio of the system can be changed in accordance with the amount of absorbing material exposed to the neutrons in the system. A sufficient mass of the absorbing material can readily be inserted into the system to reduce the reproduction ratio of the system to less than unity and thus stop the reaction. It is another object of our invention to provide an improved means and method of controlling the chain reaction in a self-sustaining system.

When the uranium and the slowing material are of such purity and the uranium is so aggregated that fewer neutrons are parasitically absorbed than are gained by fission, the system will support a chain reaction producing an exponential rise in neutron density if the overall size of the system is sufficiently large to overcome the loss of neutrons escaping from the system. Thus the overall size is important.

The size of the system will vary, depending among other things, upon the K factor of the system. If the reproduction factor K is greater than unity, the number of neutrons present will increase exponentially and indefinitely, provided the structure is made sufficiently large. If, on the contrary, the structure is small, with a large surface-to-volume ratio, there will be a rate of loss of neutrons from the structure by leakage through the outer surfaces, which may overbalance the rate of neutron production inside the structure, so that a chain reaction will not be self-sustaining. For each value of the reproduction factor K greater than unity, there is thus a minimum overall size of a given structure known as the critical size, above which the rate of loss of neutrons by diffusion to the walls of the structure and leakage away from the structure is less than the rate of production of neutrons within the system, thus making the chain reaction self-sustaining. The rate of diffusion of neutrons away from a large structure in which they are being created through the exterior surface thereof may be treated by mathematical analysis when the value of K and certain other constants are known, as the ratio of the exterior surface to volume becomes less as the structure is enlarged.

In the case of a spherical structure employing uranium bodies imbedded in graphite in the geometries disclosed herein and without an external reflector the following formula gives the critical overall radius (R) in feet:

$$K - 1 = \frac{C}{R^2}$$

where C is a constant that varies slightly with geometry of the lattice and for normal graphite lattices may have a value close to 7.2.

For a rectangular parallelopiped structure rather than spherical, the critical size can be computed from the formula $$K - 1 = C\left(\frac{1}{a^2} + \frac{1}{b^2} + \frac{1}{c^2}\right)$$

where $a$, $b$, and $c$ are the lengths of the sides in feet. The critical size for a cylindrical structure is given by the formula, irrespective of the shape of the uranium bodies:

Cylinder height, $h$, ft.
Radius, $R$, ft.

$$K - 1 = C\left(\frac{1}{h^2} + \frac{.59}{R^2}\right)$$

However, when critical size is attained, by definition no rise in neutron density can be expected. It is therefore necessary to increase the size of the structure beyond the critical size but not to the extent that the period for doubling of the neutron density is too short, as will be explained later. Reactors having a reproduction ratio ($r$) for an operating structure with all control absorbers removed and at the temperature of operation, up to about 1.005 are very easy to control. Reproduction ratio should not be permitted to rise above about 1.01 since the reaction will become difficult to control. The size at which this reproduction ratio can be obtained may be computed from modifications of the above formulae for critical size. For example, for spherical active structures the formula $$K-r=\frac{C}{R^2}$$

may be used to find R when K is known and $r$ is somewhat over unity. The same formula will, of course, give $r$ for given structures for which K and R are known.

Critical size may be attained with a somewhat smaller structure by utilizing a neutron reflecting medium surrounding the surface of the active structure. For example, a 2 foot thickness of graphite having low impurity content, completely surrounding a spherical structure is effective in reducing the diameter of the uranium bearing portion by almost 2 feet, resulting in a considerable saving of uranium or uranium compound.

The rate of production of element $94^{239}$ will depend on the rate of neutron absorption by $U^{238}$ and is also proportional to the rate at which fissions occur in $U^{235}$. This in turn is controlled by the thermal neutron density existing in the reactor while operating. Thus for maximum production of element $94^{239}$, it is essential that the thermal neutron density be at a maximum value commensurate with thermal equilibrium.

Considerable heat is generated during a neutronic reaction primarily as the result of the fission process. Following are tables showing more specifically the type of heat generated in the reactor.

*Summary by type*

|  | M. e. v./fission | Percent |
|---|---|---|
| Gamma radiation | 18 | 9 |
| Beta radiation | 16 | 8 |
| Kinetic energy of fission fragments | 160 | 80 |
| Kinetic energy of neutrons | 6 | 3 |
|  | 200 | 100 |

*Summary by locale where heat is generated*

|  | M. e. v./fission | Percent |
|---|---|---|
| In uranium | 174 | 87 |
| In moderator | 16 | 8 |
| Outside Pile | 10 | 5 |
|  | 200 | 100 |

*Summary by type and locale*

|  | M. e. v. per fission | Percent in U | Percent in C | Percent Outside |
|---|---|---|---|---|
| Kinetic energy of fission fragments | 159 | 100 |  |  |
| Kinetic energy of neutrons | 6 |  | 99 | 1 |
| Gamma radiation from fission products | 5 | 50 | 45 | 5 |
| Beta radiation from fission products | 6 | 100 |  |  |
| Nuclear affinity of neutrons (gamma radiation) | 12 | 70 | 25 | 5 |

When the system is operated for an extended period of time at a high production output of element $94^{239}$, the large amount of heat thus generated must be removed in order to stabilize the chain reaction. Most of the heat in an operating device is generated as the result of the nuclear fissions taking place in the $U^{235}$ isotope. Thus, the rate of heat generation is largely proportional to the rate at which fissions take place. In other words, if the rate of generation of neutrons is increased, a greater amount of or a more efficient coolant must be passed through the reactor in order to remove the heat thus generated to avoid damage, particularly at the central portion of the pile, by excessive heat. Thus, the highest obtainable neutron density at which a system can be operated for an extended period of time is limited by the rate at which the generated heat can be removed. That is to say, the maximum power output of a system is limited by the capacity of the cooling system. An effective cooling system is therefore a primary requirement for high power operation of a neutronic reactor and it has been found that this cooling may be accomplished most effectively by passage of the coolant in contact with or in close proximity to the uranium.

However, such coolants introduce neutron losses into the reactor and in consequence the materials that can be used as coolants in a neutronic reactor are limited, as any neutron losses will reduce K and if K is reduced by too large an amount, K may approach 1.0 so closely that critical and operating sizes would be so large as to make construction impractical.

In addition most coolants will combine with or corrode the uranium and moderator if circulated in contact therewith and in consequence in most cases coolant pipes are required. The materials that can be used for such pipes are also limited by the requirements of corrosion resistance and again by the tolerance, from a neutron absorption point of view in K reduction. To provide a reactor of practical and economical size .03 to .04 K units can be allotted to the entire cooling system and coolant within the reactor, although when a near optimum geometry in an efficient moderator, such as, $D_2O$ is used, a greater reduction in K may be tolerated. In general, it can be stated that removal of heat at powers at least up to a million kilowatts can be obtained with a K loss for the coolant and the protective materials within the reactor not substantially over .036 K.

It has been found that aluminum, beryllium, and ordinary stainless steel, for example, can be used without too great a K loss for coolant tubes and protective coverings for the uranium.

It has been found that liquid metals such as liquid bismuth, sodium, lithium, sodium potassium mixtures or other coolants comprising elements preferably having a danger sum not above about 10–15 such as helium, air, bismuth, water and diphenyl, for instance, can be used as coolants, and when used in or with the coolant tubes and protective coverings will not reduce K below the point where a reactor becomes impractical of construction. Where liquid metals are used it is frequently desirable to resort to the use of alloys in order to lower the melting point. For example lead bismuth alloys containing 5 percent or more of lead and the balance bismuth may be used. Moreover alloys containing 10–70 percent potassium and the balance sodium may be used.

It is therefore the main object of the present invention to provide a means and method of cooling a neutronic reactor with a liquid coolant without increasing the size of an operating reactor to an impractical degree as a consequence of the introduction into the reactor of neutron losses due to the coolant, coolant ducts and/or protective coverings.

In particular, bismuth in liquid form has many advantages when used as a coolant in a neutronic reactor. A large amount can be used in the reactor, due to the low neutron absorption (see table of danger coefficients), thereby providing exceptionally efficient cooling. Furthermore, such neutron absorption as does take place in the bismuth transmutes the bismuth to polonium, which is a desirable alpha emitter.

It is therefore another object of my invention to provide a means and method of cooling a neutronic reactor whereby desirable radioactive elements are produced in the coolant.

Other objects and advantages of the present invention will be apparent from the following description.

The present invention may be more fully understood by reference to the drawings, in which:

Fig. 8 is a diagrammatic partial sectional view showing how the device of Fig. 1 can be shielded;

Fig. 9 is a fragmentary and diagrammatic sectional view of a neutronic reactor having the coolant flowing over the outside of the uranium bodies;

Fig. 10 is a cross-sectional view taken as indicated by the line 10—10 in Fig. 9.

Figure 1:
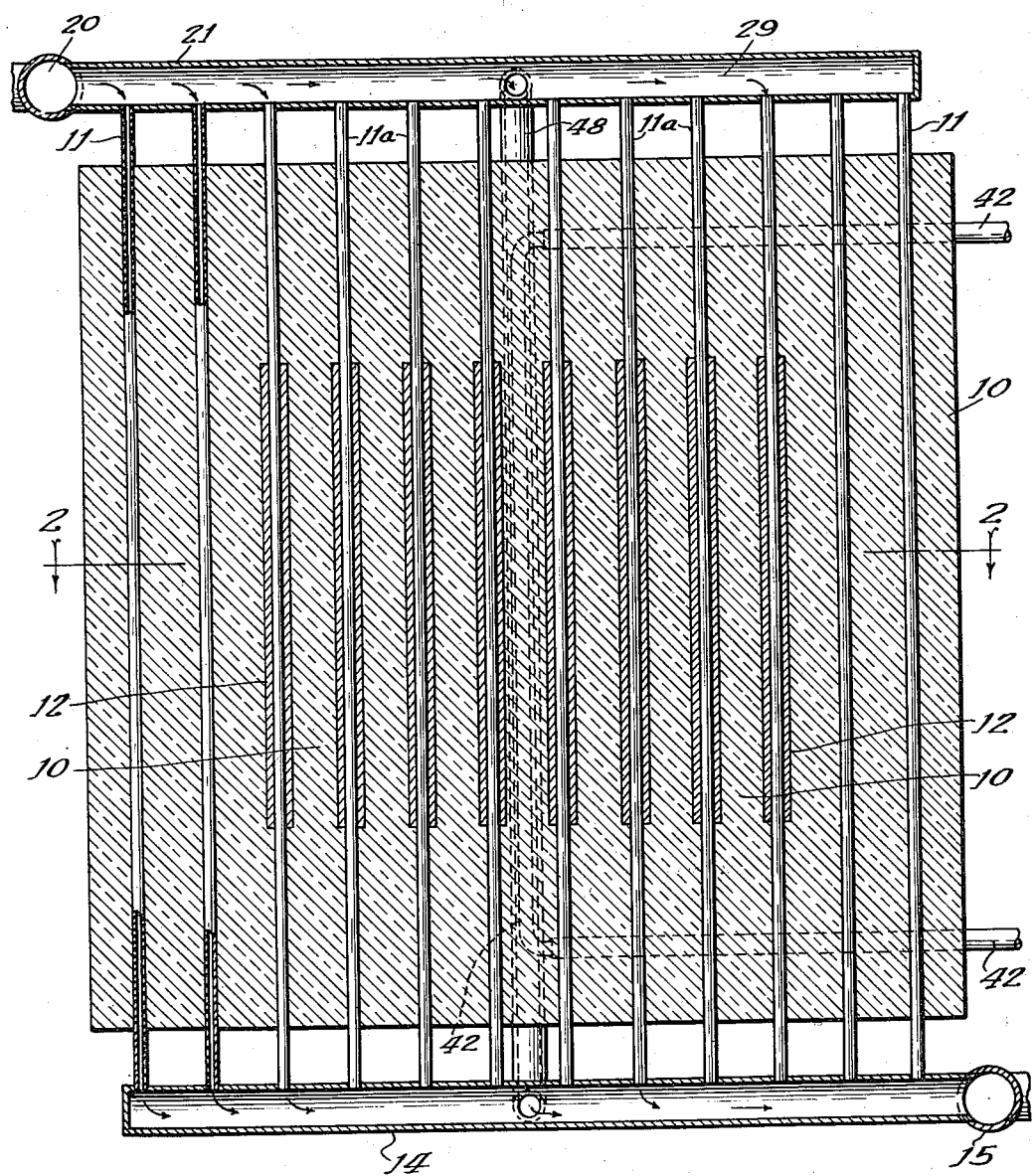
Fig. 1 is a diagrammatic vertical sectional view of a cubical moderator block and uranium bodies forming a neutronic reactor cooled by liquid metal.
Figure 2:
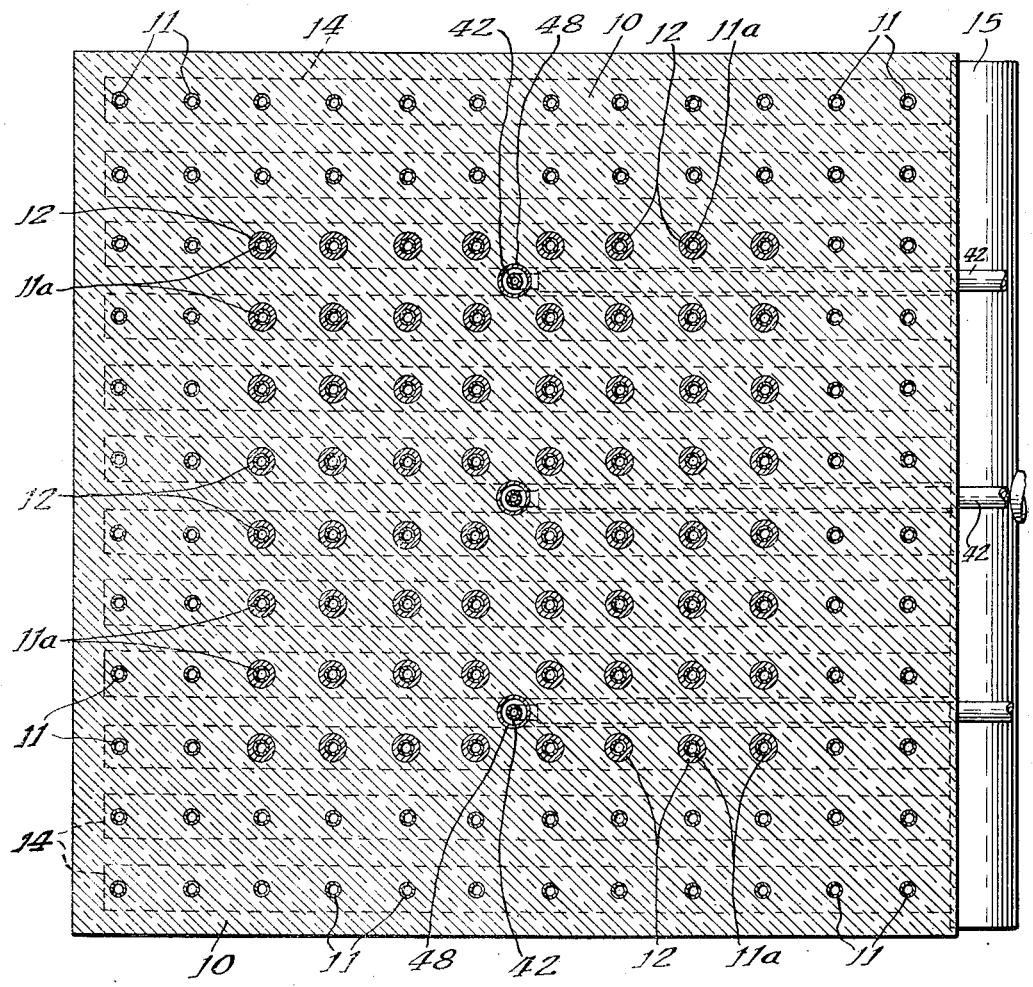
Fig. 2 is a diagrammatic horizontal sectional view of the device shown in Fig. 1 taken as indicated by the line 2—2 in Fig. 1.
Figure 3:
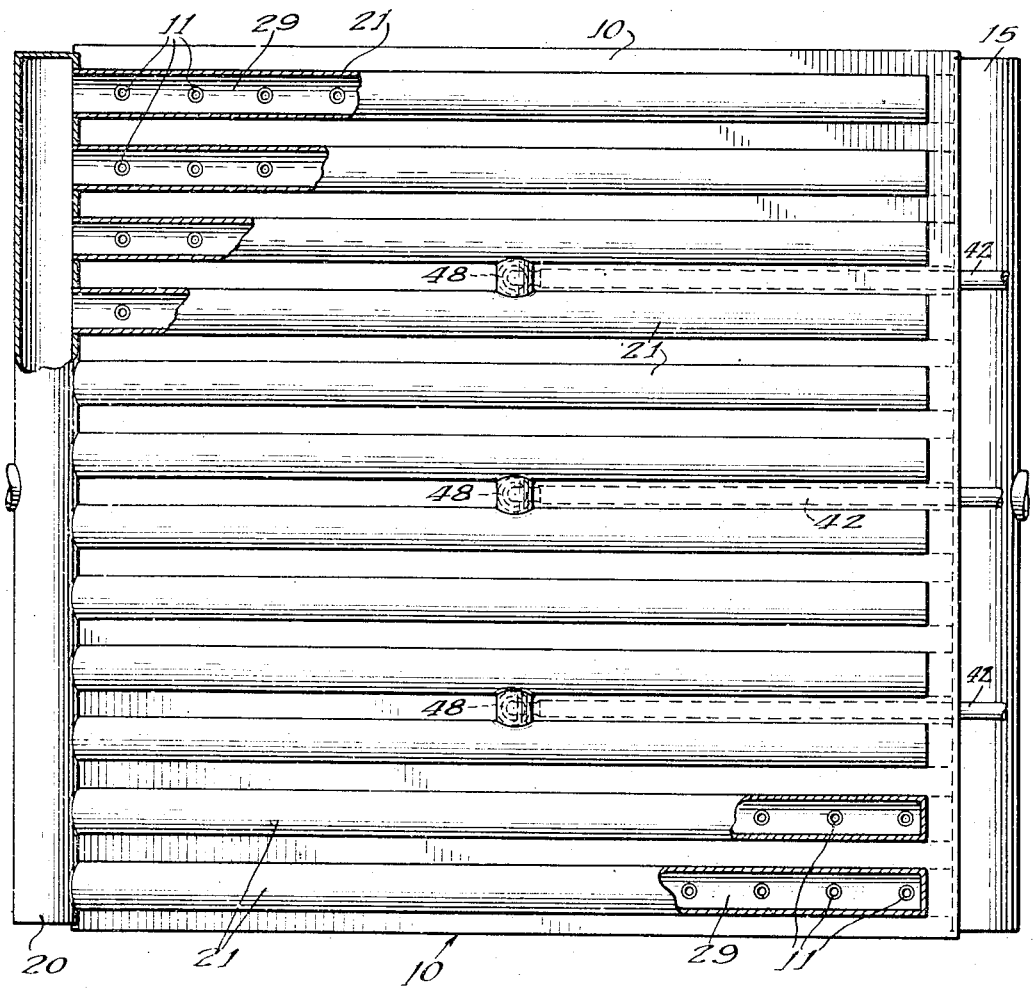
Fig. 3 is a diagrammatic top plan view of the device shown in Fig. 1, a portion being cut away to show coolant connections.

Referring first to Figs. 1, 2, and 3 a moderator block 10 is pierced with a plurality of parallel bores in which are placed coolant tubes 11. Certain inner coolant tubes 11a are surrounded by uranium tubes 12, which however do not extend to the outer surfaces of the block 10, thus providing a reflector 14 surrounding the more central uranium bearing portion of the moderator block. In this embodiment, the moderator block is made up of graphite bricks closely piled to reduce air spaces, and of high neutronic purity. The uranium tubes 12 are in close thermal contact with the coolant tubes 11a which, for example, can be of thin steel. For high power outputs on the order of 100,000 kw. and up, the moderator block may comprise about 1,000 tons of graphite and 150 tons of uranium in the form of carbide, dioxide, or metal.

The cooling agent to be circulated through the coolant tubes 11 is preferably a liquid such as molten bismuth, with an entrance temperature of about 300° C. About 100 tons of bismuth may be used in the reactor at one time. Bismuth has many advantages as a coolant for a neutronic reactor, having a low capture cross-section for neutrons, accounting for less than 1 percent reduction in K even when large amounts are present in the reactor. Furthermore, the neutrons captured by the bismuth while circulating produce a useful product, i. e., radioactive polonium, the use of which will be explained later. Again, bismuth has excellent heat transfer properties, permitting high heat abstraction from the operating reactor.

Figure 4:
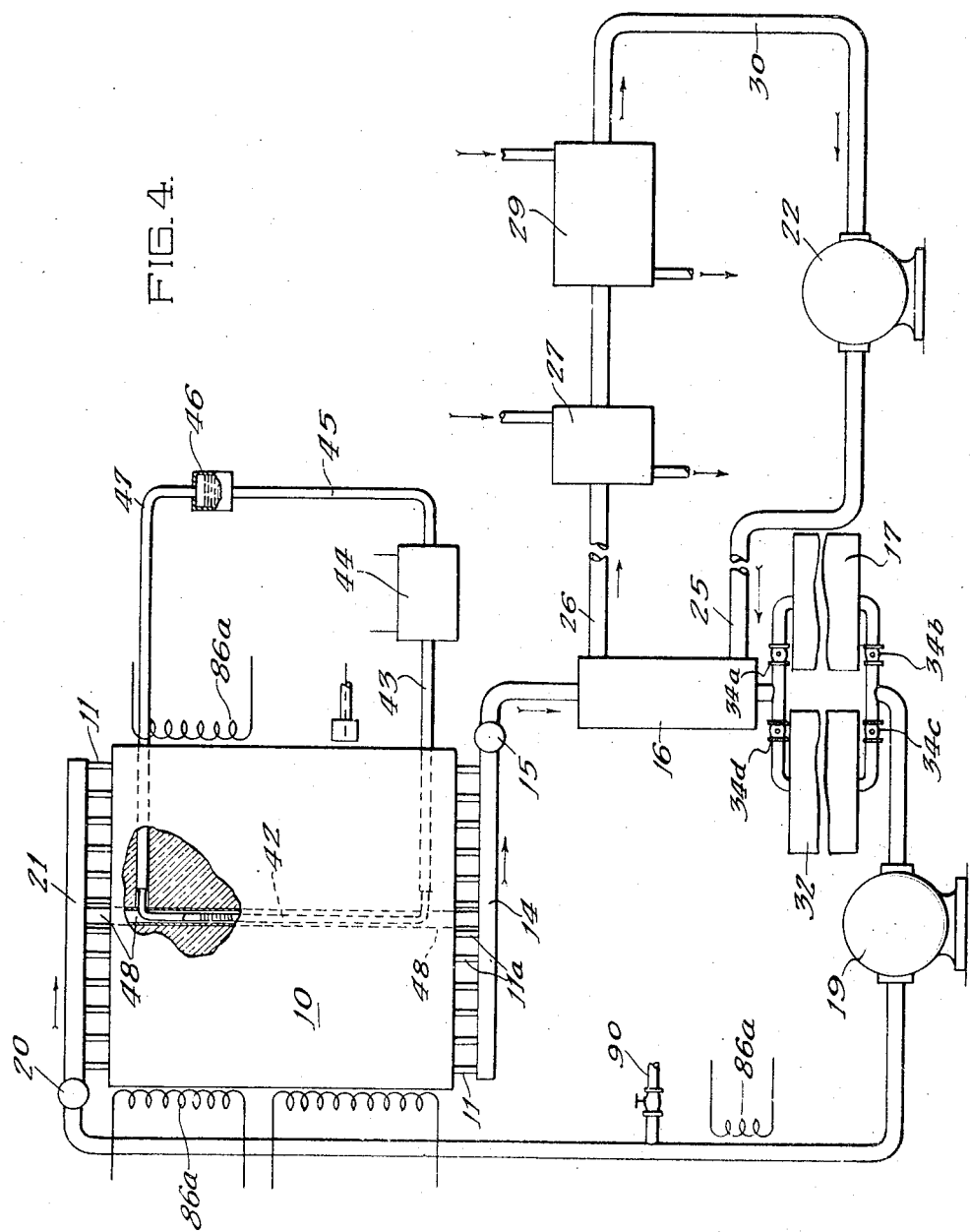
Fig. 4 is a diagram showing primary and secondary cooling circuits as applied to the device of Fig. 1.

In order to circulate the liquid bismuth through the reactor, a circulating system is required, such as is shown in Fig. 4, for example. All coolant tubes terminate beneath the reactor in a plurality of parallel outlet headers 14 entering a main outlet header 15, from which the coolant is passed through a primary heat exchanger 16. The coolant then passes into a coolant tank 17 from which it is pumped back into the reactor by coolant pump 19 through a main inlet header 20 and parallel inlet headers 21, completing the circuit through the coolant tubes 11 and 11a. All parts of the reactor and coolant circuit so far described must be shielded from operating personnel because of neutron and gamma radiation, preferably with the reactor and the exterior primary coolant circuit in separate shielded compartments, not shown.

A secondary coolant circuit may be used which does not require shielding except where the circuit passes through the primary heat exchanger 16. This secondary coolant circuit is also designed to carry and circulate liquid bismuth or bismuth-lead eutectic and comprises a secondary coolant pump 22 pumping into the primary heat exchanger 16 through secondary coolant inlet and outlet conduits 25 and 26, respectively, passing through a shield wall (not shown).

From the primary heat exchanger 16 the secondary coolant passes through a steam boiler 27 where the heat is transferred directly to water, the secondary coolant remaining in liquid form. The steam produced is made available for power production. When a bismuth-lead eutectic having a melting point of about 130° C. is used as a secondary coolant, an additional heat exchanger 29 may be used in the return pipe 30 to the pump 22. This will further cool the secondary coolant, and if desired, can be used to preheat feed water entering boiler 27.

The liquid bismuth used to directly cool the reactor has a relatively high melting point, about 300° C., and in order to cool the uranium after a period of irradiation, it may be desirable to add lead to the primary coolant. This can be done by providing a lead storage tank 32 positioned in parallel with the bismuth storage tank 17, both tanks being under the control of remotely operated valves 34a, 34b, 34c and 34d, so that any required dilution with lead can be made. Normally, valves 34c and 34d may be closed so that the bismuth coolant will flow from heat exchanger 16, through valve 34a, tank 17, valve 34b and then to pump 19. A small amount of lead can be introduced into the system by opening valve 34c a small degree. The tank 17 should have sufficient capacity to accommodate the added lead. If all the lead in tank 32 is to be introduced into the system, both valves 34c and 34d may be opened so that the circulation of coolant thereafter will be through both tanks.

The reactor may be shielded as shown in Fig. 8. A layer of iron 35 is used to surround the reactor outside of the reflector 14, and as neutrons escaping through the reflector are largely thermal neutrons, they can be in most part absorbed in the iron layer 35. A satisfactory weight ratio as between the iron and the graphite can be approximately 2 to 3. In addition, iron absorbs gamma radiation resulting from fission and the decay of fission products. It may also be desirable to support and surround the reactor and its iron shield by an additional concrete shield 36, as concrete absorbs neutrons due to its water content, and can be made from high density aggregates to absorb gamma radiation.

Before the reactor can be operated to sustain a chain neutron reaction, means for control of the reaction must be provided.

In Fig. 4 a device for controlling the chain reaction in the lattice structure 21 is diagrammatically illustrated. Three steel tubes 42 (see Figs. 1 and 3) pass through the reactor and each is connected at the bottom to a pipe 43 entering an electrodynamic pump 44 such as that disclosed by Einstein and Szilard (British Patent 303,065 of 1930). On a discharge side of the pump 44 is a pipe 45 leading into a storage tank 46, which, in turn, is connected to the tops of the tubes 42 by means of suitable piping 47. The diameter of the steel tube 42 is approximately 1 centimeter, and the wall thickness is approximately 1.5 millimeters.

A low melting alloy containing bismuth, lead, tin, and cadmium, having a melting point of approximately 68 degrees centigrade, is contained in this control system. This alloy readily absorbs neutrons due to its cadmium content, and the chain reaction is stopped at all times when the tube or tubes 42 are filled, or nearly filled, with alloy.

At all times when the pump 44 is not operating, the control alloy level, both in the pipes 42 and the container 46, is as indicated in Fig. 4. In this instance, the tubes 42 are filled to the extent that the chain reaction is stopped. To place the device in operation, the control alloy is first heated by suitable means to place it in liquid form. Pump 44 is then energized to withdraw some of the alloy from tube 42, thereby raising the alloy level in the container 46. This pump 44 is not intended to circulate the alloy through the control system, but merely serves as a variable pressure differential means to maintain a difference in level between the tube 42 and the container 46, so that the tube 42 may be more or less filled with the control alloy, depending upon the rate of reaction desired in the lattice structure. If for any reason the pump 44 fails, the alloy levels in the tube 42 and the container 46 are returned by gravity to the positions shown in Fig. 4.

The control alloy in each tube 42 within the reactor is maintained at the desired operating temperature by a cooling system including a pipe 48 communicating at the top with one of the inlet headers 21 and at the bottom with one of the outlet headers 14. The cooling medium passing through the pipe 48 is the liquid bismuth utilized in the primary cooling circuit.

Figure 5:
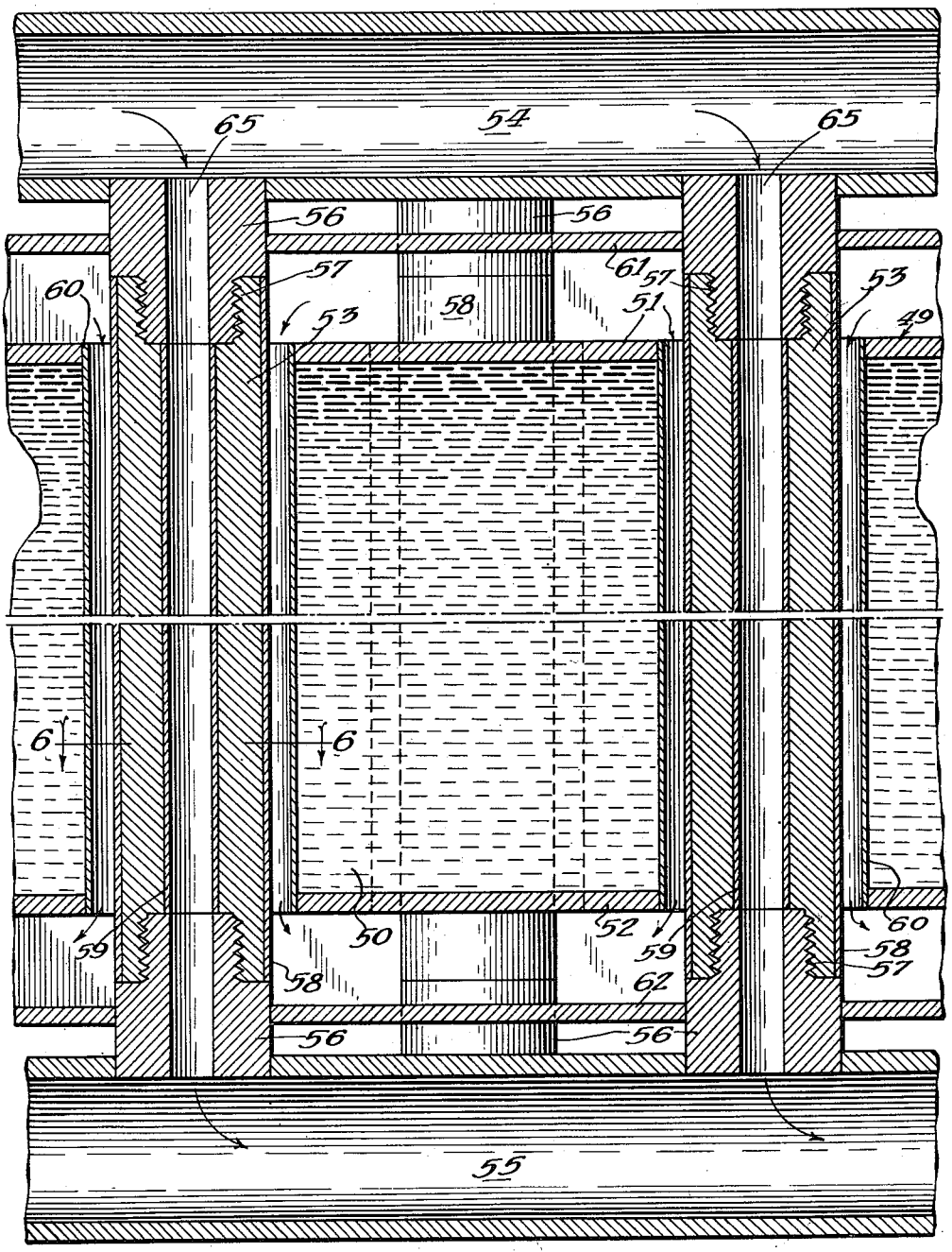
Fig. 5 is a diagrammatic vertical sectional view of a neutronic reactor using a liquid moderator and a liquid metal coolant.
Figure 6:
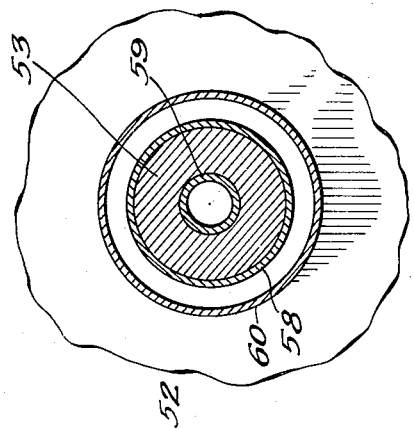
Fig. 6 is a cross-sectional view of a coolant channel and uranium tube taken as indicated by the line 6—6 in Fig. 5.

Referring now to Figs. 5 and 6, a modified form of the invention is shown wherein heavy water can be utilized as the slowing down agent. For purposes of illustration, the lattice system comprises a steel shell 49 filled with heavy water indicated at 50. The top and bottom walls of the shell are shown, respectively, at 51 and 52. A plurality of uranium tubes 53 (Fig. 5) project vertically downwardly through the heavy water 50, and at the top and bottom communicate with the branch inlet and discharge headers 54 and 55 respectively. The rods are equidistant from each other and are disposed in a lattice pattern.

Referring to Fig. 5, steel nipples 56 are threaded into the opposite ends of the uranium tubes 53, as indicated at 57, and are welded or otherwise secured to the branch headers 54 and 55 as the case may be.

The uranium rods 53 are surrounded by a thin sheath 58 of steel and the inside of the uranium tube 53 likewise is covered or coated, as indicated at 59, with a steel covering. Concentrically surrounding the uranium tubes 53 and spaced therefrom are aluminum or steel tubes 60, fastened at the top and bottom to the upper and lower walls 51 and 52, respectively, of the lattice shell or tank 49.

Figure 7:
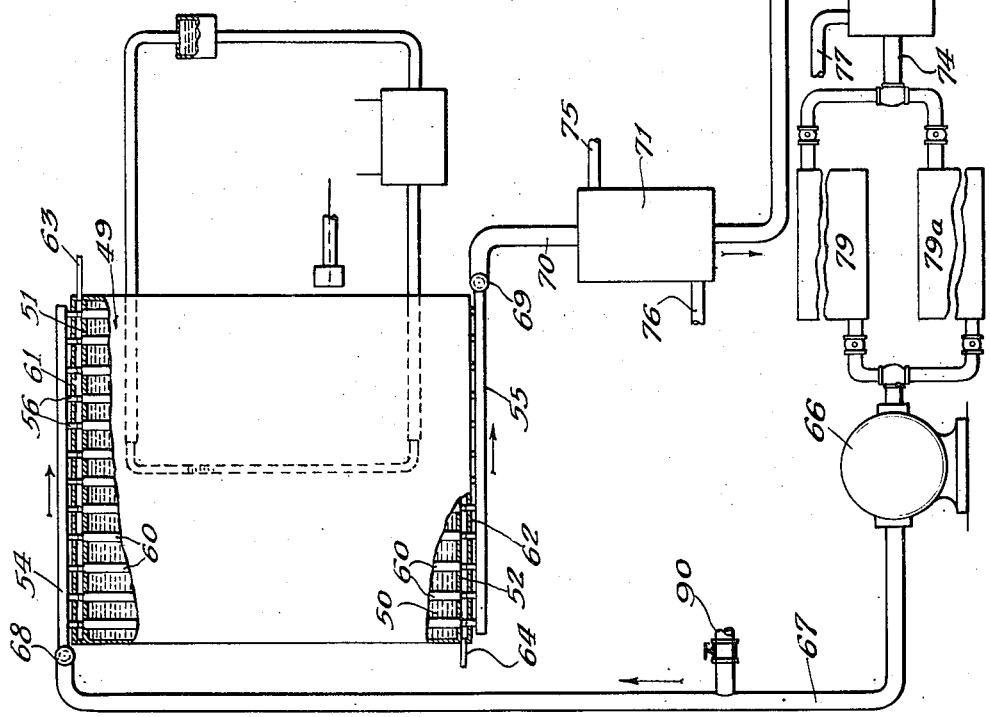
Fig. 7 is a diagram showing a coolant circuit for the device shown in Fig. 5.

Spaced above and below the upper and lower walls 51 and 52, respectively, of the lattice shell are walls 61 and 62, respectively, forming upper and lower headers filled with some suitable gas, such for example, as helium. This gas is charged into the system—for example, through a pipe and fills the annular spaces between the uranium tubes 53 and the concentric aluminum tubes 60. The purpose of the chamber above and below the upper and lower walls 51 and 52, respectively, at the lattice shell 49 is to maintain a constant supply of helium gas to fill the annular spaces surrounding the uranium tubes 53. This gas can be circulated through the system by pipes 63 and 64 (Fig. 7). The purpose of this space and the gas in it is to cool and partially insulate the walls of the uranium tube from the heavy water, because the operating temperature of the uranium is considerably above the boiling point of heavy water, and it is not intended that the slowing agent be permitted to boil. The gas may be circulated through the system and then passed through a heat exchanger for cooling, in which case the helium functions as a coolant.

Passing through the center of the uranium rods 53 are passages 65, which likewise extend through the upper and lower nipples 56 so as to provide a continuous passage through each uranium tube 53 from the upper branch header 54 to the lower branch discharge header 55.

Referring to Fig. 7, a suitable bismuth cooling system for maintaining the proper temperature of the heavy water lattice device is illustrated diagrammatically and includes a pump 66 discharging into a pipe 67, which, in turn, empties into a supply header 68. The branch supply headers 54 receive the coolant from the main supply header 68 and discharge the coolant through the downwardly extending passages 65 in the uranium tubes 53. The lower branch discharge headers 55, which receive the coolant from the passages through the uranium tubes, discharge into a main discharge header 69, which in turn empties into a pipe 70, from which the coolant passes through a suitable heat exchanger 71, and then returns to the pump 66 through a pipe 72, a secondary heat exchanger 73 and pipe 74. The heat exchanger 71 may be a steam boiler in which water entering through pipe 75 may be converted into steam, which is removed from the boiler through a pipe 76. The heat exchanger 73 may be water cooled through pipes 77 and 78. The purposes of the second heat exchanger 73 is to cool further the cooling medium after it has been utilized for producing steam in the heat exchanger or boiler 71, so that the temperature of the coolant entering the lattice structure will be sufficiently low to cool the device effectively, as in the first embodiment described. As in the first embodiment described bismuth and lead tanks 79 and 79a, respectively, are provided.

In the cooling systems so far described and shown, the coolant flows through the central axis of each uranium tube. Other circulating arrangements will function equally satisfactorily. For example, the uranium may be in the form of rods and the cooling agent may be circulated lengthwise along the outer surface of the rods. A space between each uranium rod and the surrounding slowing down material, where graphite is this medium, may serve as the passage for the coolant.

Such a construction is shown in Figs. 9 and 10, wherein the branch header 80 feeds coolant into outer coolant tubes 81 in which are hung jacketed uranium rods 82 by means of coned hangers 84 provided with spacing lugs 85 to center the rods in the coolant tubes 81. In order that a reflecting layer be provided outwardly of the uranium bearing portion of the moderator block 10, the hangers 84 are of non-fissionable material and the rods 82 terminate short of the bottom surface of the moderator block. The other conditions are the same as described for previous embodiments.

To place the reactors in operation, the circulation lines and the bismuth or bismuth alloys are heated as by suitable electric heaters diagrammatically illustrated at 86, and the reactor block initially heated either by its own reaction or by electric heaters 86a (Figs. 4 and 7). As the initial heating occurs before the pumps go into action, no excess power installation is required.

The reaction is controlled by use of the column of absorbing metal, the amount thereof in the reactor being varied, first by withdrawing the metal until the neutron reproduction ratio exceeds unity slightly so that the neutron density will rise to a desired operating power, and the inserting sufficient of the absorbing metal to maintain the neutron reproduction ratio at an average value of unity. As the neutron density rises and the alloy is liquid the pumps are started, circulating the coolant through the reactor.

The liquid bismuth will enter the reactor at a temperature of about 300° C., flow through the coolant tubes, either internally or externally of the uranium tubes or rods as the case may be by gravity, and leave the reactor at about 600° C. with a velocity of about 4 meters per second. A flow of about 3.5 meters per second will remove about 1.3 million kw. from the reactor with 100 tons of bismuth in the reactor at one time.

After operation for several months, the chain reaction may be stopped. The bismuth circulation may be maintained for another month or so. Then by admitting lead from tanks 32 and 79a approximately equal to the quantity of bismuth in the reactor, the uranium can be cooled down to about the melting point of the bismuth lead eutectic. The uranium can then be removed, if desired, for the recovery of 94, and the embodiment shown in Fig. 9 is particularly adapted to have the rods removed from the reactor when radioactivity thereof has been reduced by time decay.

One of the features peculiar to the type of reactor so far described, is that desirable radioactive elements are formed in the coolant. Bismuth, by neutron capture and radioactive decay, is transmuted to polonium, which is a strong alpha ray emitter and thus highly desirable as an activator for fluorescent materials, thus providing a light source decaying to its half value in about 140 days. The coolant can be bled off through pipe 90 and polonium can be removed from the bismuth coolant by well-known chemical methods. When the reactors are operated for polonium production the uranium need not be removed and the embodiments of the invention shown in Figs. 1 and 5 are suitable for such use. In this manner energy released as a result of the chain reaction is removed from the reactor in a useful form, for example to produce light. It is, of course, well known that heat is generated as a result of radioactive decay of an isotope and this heat may be utilized in some useful form.

Bismuth and bismuth alloys, because of their high heat transfer characteristics permit high utilization of uranium, that is, more heat per ton can be removed from the reactors in a given time than with other coolants having poorer heat transfer capabilities. Furthermore, bismuth as will be noted from the table of danger coefficients heretofore set forth, has exceptionally low neutron absorption. Thus more of the coolant can be inserted in the reactor for a given K loss.

However, it is to be clearly understood that other liquid coolants can be used in neutronic reactors such as herein described when proper channels are provided. Both water and diphenyl can be used, even through the neutron capture cross-section of either one is much higher than that of bismuth. Due to their higher capture cross-sections, not as much of the coolant can be present in the reactor at any one time and for that reason the spacings in the coolant channels, when water or diphenyl are used, must be greatly reduced from those used in the case of a bismuth cooled reactor. The relation of the sizes of the coolant channels is shown in Figs. 6 and 10.

In Fig. 6 the internal coolant channels are such as to contain about ⅔ of the weight of bismuth to that of uranium. In Fig. 10 the external coolant channels can be such as to give a ratio of bismuth to uranium of about 1 to 1, and in neither case will the K loss due to the coolant alone be over 1 percent with the protective tubes causing about an additional 1.75 percent K loss in the embodiment shown in Fig. 6.

Other liquids than bismuth can be used, with comparable but no greater K losses. The main difference is that much less power can be removed from the reactor with coolants of higher capture cross sections.

Bismuth and its alloys have the multiple advantage when used as coolants that they can be used in large amounts in the reactors, and also utilize the neutrons absorbed to produce a desirable radioactive product that can be recovered.

It will be noted that in all examples given herein, it is the uranium that is cooled. In view of the fact that most substances absorb neutrons with a cross section that varies inversely with the neutron velocity an effective increase in K through better neutron distribution is obtained by cooling the uranium metal to a lower temperature than that prevailing in the moderator. This is accomplished by directly cooling the uranium. While the moderator immediately adjacent the coolant may be at the same temperature as the coolant, the moderator between the uranium bodies will heat up, due to neutron absorption, etc.

If the moderator is "hot" in a thermal sense, the "thermal" neutrons are moving at greater speeds than when cold. This reduces the capture cross-section of the moderator (especially with carbon) for thermal neutrons and consequently reduces moderator losses. On the other hand, if the uranium metal is cooled until it may be considered "cold" with respect to the moderator, the absorption cross-section (both for fission and simple capture) will be enhanced so that the ratio of thermal neutrons captured in uranium to those captured in moderator is increased with the differential cooling.

When outside cooling is used, the coolant film serves, at least partially, to cool down inflowing "hot" neutrons from the moderator, making capture in uranium more probable; and "cold" neutrons in diffusing into the moderator tend to become "hot" and are thus partially preserved for future capture by the uranium.

This effect is known as differential cooling and is one of the advantages of cooling the uranium instead of the moderator.

While the theory of the nuclear chain fission mechanism in uranium set forth herein is based on the best presently known experimental evidence, I do not wish to be bound thereby as additional experimental data later discovered may modify the theory disclosed.

What is claimed is:

A neutronic reactor comprising a steel shell filled with heavy water, inlet and discharge headers for liquid bismuth disposed respectively above and below the steel shell, inlet and discharge headers for helium disposed respectively above and below the steel shell between the said first-mentioned headers and the steel shell, tubes comprising a central portion comprising uranium in an amount sufficient to maintain a chain reaction extending between said first-mentioned headers and means for passing bismuth through said uranium tubes, tubes concentrically surrounding said uranium tubes extending between said second-mentioned headers, means for passing helium through said second-mentioned tubes exteriorly to the uranium tubes whereby the uranium is cooled to a temperature above the boiling point of heavy water by the liquid bismuth and the heavy water is prevented from boiling by the helium.

References Cited in the file of this patent

UNITED STATES PATENTS

| | | |
|---|---|---|
| 863,287 | Kunz | Aug. 13, 1907 |
| 2,708,656 | Fermi et al. | May 17, 1955 |
| 2,736,696 | Wigner et al. | Feb. 28, 1956 |
| 2,773,823 | Goett | Dec. 11, 1956 |

FOREIGN PATENTS

| | | |
|---|---|---|
| 303,065 | Great Britain | May 26, 1930 |
| 648,293 | Great Britain | Jan. 3, 1951 |
| 861,390 | France | Oct. 28, 1940 |
| 233,011 | Switzerland | Oct. 2, 1944 |

OTHER REFERENCES

Systematic Inorganic Chemistry, by R. M. Craven and G. D. Lander, pub. by Blackie & Son, Ltd., London, 1932, pp. 412–417.

Curran and Baker: MDDC-1296, Atomic Energy Comm. Date of Man., November 17, 1944, date declassified September 23, 1947, 4 pages.

Smyth: "Atomic Energy for Military Purposes," pp. 75, 84, 85, 103. Also pp. 22, 177–180 (August 1945).

MDDC-893, pub. by Atomic Energy Comm. Paper by Farrington Daniels, April 1, 1947, pages 10, 11 (available from A. E. C., Oak Ridge, Tenn.).

Harwell: The British Atomic Energy Research Establishment, 1946–1951, Her Majesty's Stationery Office, London, 1952, pp. 39–42.

Business Week, September 1, 1945, pp. 45–64.

Kelly et al.: Phy. Rev. 73, 1135–9 (1948).

A Forum Report, "Nuclear Reactor Development," July 1954, Atomic Industrial Forum 260, Madison Ave., N. Y. Edited by O. Townsend et al. Page 18.